(12) United States Patent
Banko

(10) Patent No.: US 7,293,749 B2
(45) Date of Patent: Nov. 13, 2007

(54) SELF ALIGNING FOOT ASSEMBLY

(75) Inventor: Joshua David Banko, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/495,385

(22) Filed: Jul. 27, 2006

(65) Prior Publication Data

US 2006/0262498 A1    Nov. 23, 2006

Related U.S. Application Data

(62) Division of application No. 10/796,545, filed on Mar. 8, 2004, now Pat. No. 7,095,610.

(51) Int. Cl.
*F16M 11/16* (2006.01)
(52) U.S. Cl. .................................... 248/188; 312/351.1
(58) Field of Classification Search ................ 248/188, 248/615, 677; 312/351.1
See application file for complete search history.

(56) References Cited

U.S. PATENT DOCUMENTS

| 5,369,549 | A | * | 11/1994 | Kopp et al. | ................. | 361/679 |
| 6,006,557 | A | * | 12/1999 | Carl et al. | .................... | 70/58 |
| 6,222,549 | B1 | | 4/2001 | Hoddie | | |
| 6,570,756 | B2 | * | 5/2003 | Alfonso et al. | ............ | 361/683 |

\* cited by examiner

*Primary Examiner*—Yean-Hsi Chang
(74) *Attorney, Agent, or Firm*—Blakely, Sokoloff, Taylor & Zafman LLP

(57) ABSTRACT

A foot assembly includes a foot including a snap and a first alignment feature, the snap and the alignment feature are coupled to a base, and the first alignment feature extending a greater distance from the base than an engagement of the snap. The assembly also includes a foot socket coupled to the foot, the socket including an undercut and a second alignment feature. In one aspect, the second alignment feature interfaces with the first alignment feature. In another aspect, the socket is coupled to an enclosure of a portable computing device.

28 Claims, 24 Drawing Sheets

SECTION A-A

SECTION B-B

SECTION B-B

SELF ALIGNING FOOT ASSEMBLY

This application is a divisional of U.S. patent application Ser. No. 10/796,545, filed on Mar. 8, 2004, now U.S. Pat. No. 7,095,610.

TECHNICAL FIELD

This disclosure relates generally to a foot assembly, and in particular, to a self aligning foot assembly for use with portable computing devices.

BACKGROUND OF THE INVENTION

Portable computing devices, also referred to as notebook or laptop computers, typically have feet disposed on their bottom surfaces. The feet raise the portable computer off of a supporting surface, such as a desk or table. This may serve several purposes, such as preserving the finish of the bottom surface of the portable computer, or improving cooling of the portable computer, among others. FIG. 1A illustrates a computing device 120, such as a typical portable computer. Portable computing device 120 includes a display housing rotatably coupled to a main housing or enclosure through a hinge. The display housing includes a display screen. The main housing includes a keyboard and a pointing device. Additional aspects of the internal circuitry of a computer such as computing device 120 may be found in U.S. Pat. No. 6,222,549, which is incorporated by reference herein. The main housing includes a base which is the bottom surface of the main housing. A portable computer 120 typically includes four feet 100 disposed on the bottom of an enclosure 106, as illustrated in FIG. 1B. FIG. 1B illustrates a bottom view of the computing device 120 illustrated in FIG. 1A. Each foot 100 is typically positioned at a corner of the bottom surface of an enclosure 106 of the portable computer 120. The foot 100 is part of a foot assembly 110, which includes the foot 100 and a foot socket 104.

FIG. 1C illustrates an exploded view of a prior art foot assembly 110 for a portable computer, such as the computer 120 illustrated in FIG. 1A. Computer 120 includes an internal supporting chassis 108 to which various hardware components of the computer are attached, such as for example a motherboard, memory, and battery. The chassis 108 is typically comprised of a metal or another rigid material. At the point on the chassis 108 where a foot assembly 110 is to be located, the chassis 108 includes an internally threaded screw bore 109 to accommodate a machine screw 102. The screw 102 is fastened through a foot socket 104 into the bore 109 to retain the enclosure 106 to the supporting chassis 108. The enclosure 106, or case, is typically comprised of a rigid material, and houses the components of the computer. The enclosure 106 includes a recessed well 107 to accommodate the socket 104. Once the screw 102 is installed, the head of screw 102 remains exposed within the center portion of the socket 104. To cover the head of screw 102, a foot 100 is installed into the foot socket 104.

FIG. 1D illustrates a perspective view of the prior art foot 100. Foot 100 includes three snaps 150 extending from a cylindrical base 152. The three snaps 150 are positioned radially about the perimeter of the base 152, and are spaced equally from each other. Clearances 101 are positioned between adjacent snaps 150. The snaps 150 are radially symmetrically positioned about the perimeter of the base 152. Foot 100 is radially symmetric about the central axis of base 152. Each snap 150 is attached to the base 152 at a proximal end, and each snap 150 has a substantially wedge shaped cross section. A pawl 153 is an engagement disposed at the distal end of each snap 150 from the base. Pawl 153 includes an edge on the end of each snap 150. Pawl 153 is designed such that when installed into foot socket 104, the pawl 153 catches the snap 150 on the foot socket 104 so as to prevent the foot 100 from disengaging the foot socket 104. FIG. 1E illustrates a top view of the foot 100. FIG. 1F illustrates a cross-sectional side view of the foot 100 taken along the section A-A in FIG. 1E. FIG. 1G illustrates a cross-sectional side view of the foot 100 taken along the section B-B in FIG. 1E.

FIG. 1H illustrates a perspective view of a prior art foot socket 104. Foot socket 104 includes a substantially cylindrical base 111 and a raised center portion 112. Foot socket 104 is radially symmetric about the central axis of base 111. The base 111 is disc shaped, with a bore in the center. The raised center portion 112 has a substantially circular shape, and is coupled to the base 111 by three raised supports 113. The supports 113 are spaced equally about the base 111. The socket 104 is indexed in the well 107 using a ledge 121 so that the socket 104 may only be placed in the well 107 in a single rotational orientation.

FIG. 1I illustrates a top view of the foot socket 104. FIG. 1J illustrates a cross-sectional side view of the foot socket 104 taken along the section A-A in FIG. 1I. FIG. 1K illustrates a cross-sectional side view of the foot socket 104 taken along the section B-B in FIG. 1I. FIG. 1L illustrates a bottom view of the foot socket 104. FIG. 1M illustrates a cross-sectional side view of the foot socket 104 taken along the section C-C in FIG. 1L. The raised center portion 112 includes an aperture 114 to accommodate screw 102. When screw 102 is installed into chassis 108, the head of screw 102 is adjacent to an exterior (or bottom) side 118 of the socket 104, while the interior (or top) side 117 of the socket 104 is adjacent to the surface of well 107 of the enclosure 106. Socket 104 includes three circular cosmetic features 190 on the exterior surface 118 of the base 111. Foot socket 104 includes three undercuts 115 disposed between adjacent supports 113. Undercuts 115 are coupled to the base 111 and extend towards the central axis of the base 111. Undercuts 115 are edges on which pawl 153 catches when foot 100 is installed into the foot socket 104. Foot socket 104 includes three vertical orientation ribs 116. Each vertical rib 116 is disposed on the exterior side 118 of each support 113, and extends along the length of each support 113 between the base 111 and the center portion 112.

The dimensions of the prior art foot 100 are now described. Referring to FIG. 1F, the diameter of base 152 is 8.00 mm with a tolerance of −0.10 mm. The diameter of the snaps 150 about the base 152 is 6.20 mm with a tolerance of −0.10 mm. The angle of pawl 153 is 15.0 degrees from perpendicular of the upper surface of base 152. The overall height of foot 100 from the lower surface of base 152 to the upper surface of the snaps 150 is 3.60 mm. The edge of each snap 150 has a 0.30 mm radius or blend (R0.30) applied to the edge between the upper and side surfaces of the snap 150. The inner diameter between the snaps 150 is 3.00 mm. The diameter of the snaps 150 at pawls 153 is 6.70 mm with a tolerance of ±0.05. The height of pawls 153 from the upper surface of base 152 is 0.96 mm with a tolerance of ±0.05 mm. The height of base 152 is 1.84 mm with a tolerance of ±0.010 mm. Referring to FIG. 1G, the edge of the base 152 a 0.50 mm radius or blend (R0.50) applied to the edge between the upper and side surfaces of the base 152. The foot 100 has a volume of about 115.12 mm$^3$.

The dimensions of the prior art foot socket 104 are now described. Referring to FIG. 1I, arc angle 170 between the center of support 113 and the edge of support 113 is 30 degrees. Arc angle 171 of support 113 is 50 degrees. Arc angle 172 between undercuts 115 is 60 degrees. Arc angle 173 between adjacent supports 113 is 70 degrees with a tolerance of ±0.50 degrees. Referring to FIG. 1J, the height of undercut 115 from the lower surface of base 111 is 1.80 mm with a tolerance of ±0.05 mm. The depth of ledge 121 from support 113 is 0.5 mm with a tolerance of +0.05 mm. Referring to FIG. 1K, the interior surface of the three supports 113 at base 111 are positioned about a diameter of 9.50 mm. The diameter of the center portion 112 is 7.89 mm with a tolerance of −0.05 mm. The diameter of aperture 114 is 2.80 mm. The angle of support 113 is 15 degrees from perpendicular of base 111. The center portion has a depth of 0.80 mm with a tolerance of −0.10 mm. The height of the lower surface of undercut 115 from the lower surface of base 111 is 0.50 mm. The height of the lower surface of undercut 115 from the upper surface of undercut 115 is 0.26 mm. The base 111 is 1.20 mm thick, with a tolerance of ±0.05 mm. The upper surface of center portion 112 is 3.00 mm above the upper surface of base 111, with a tolerance of −0.05 mm. The overall height of socket 104 is 4.20 mm. The outer diameter of the base 111 is 15.00 mm. The inner diameter of base 111 is 8.20 mm with a tolerance of +0.10 mm. The diameter of the outer portion of the three undercuts 115 is 7.56 mm. Referring to FIG. 1L, the angle 175 between cosmetic features 190 is 120 degrees. Referring to FIG. 1M, the depth of cosmetic features 190 is 0.5 mm, and the diameter of the cosmetic feature 190 is 1.7 mm.

SUMMARY OF THE DESCRIPTION

A self aligning foot assembly is described herein. The following provides a summary of some, but not all, embodiments described within this disclosure; it will be appreciated that certain embodiments which are claimed will not be summarized here. In one exemplary embodiment, a foot includes a base, and a snap extending from the base, the snap having a proximal end and a distal end. In one aspect, the proximal end is coupled to the base and the distal end includes an engagement pawl. The foot also includes a post extending from the base, the post having a proximal end and a distal end. In one aspect, the proximal end of the post is coupled to the base and the distal end extends a greater distance from the base than the engagement. In one aspect, the foot is coupled to an enclosure of a portable computing device.

In another exemplary embodiment, a foot socket includes a base, and a raised center portion coupled to the base by a plurality of supports. In one aspect, a first support includes a first vertical rib, and a second support includes a slot. The socket also includes a plurality of undercuts coupled to the base, where each undercut is adjacent to two supports. In another aspect, the socket is coupled to an enclosure of a portable computing device.

In yet another exemplary embodiment, a foot assembly includes a foot including a snap and a first alignment feature, the snap and the alignment feature are coupled to a base, and the first alignment feature extending a greater distance from the base than an engagement of the snap. The assembly also includes a foot socket coupled to the foot, the socket including an undercut and a second alignment feature. In one aspect, the second alignment feature interfaces with the first alignment feature. In another aspect, the socket is coupled to an enclosure of a portable computing device.

The present invention is described in conjunction with hardware of varying scope. In addition to the aspects of the present invention described in this summary, further aspects of the invention will become apparent by reference to the drawings and by reading the detailed description that follows.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
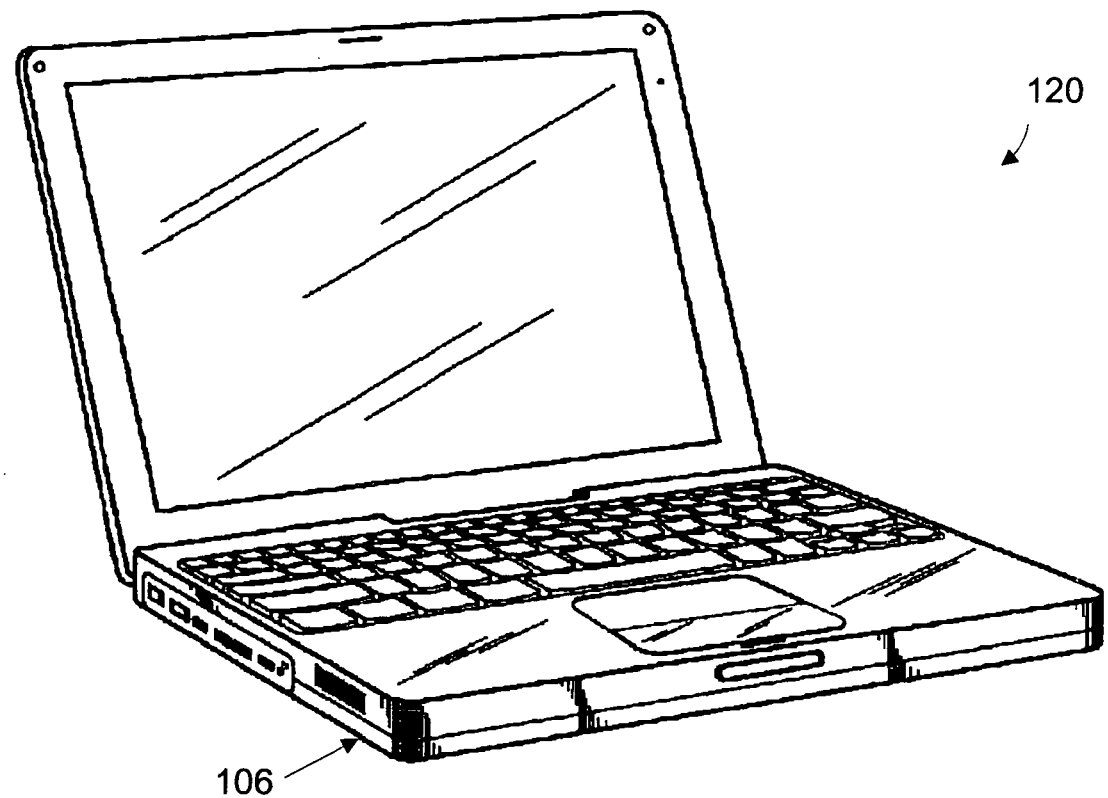
FIG. 1A illustrates a portable computing device 120.
Figure 1B:
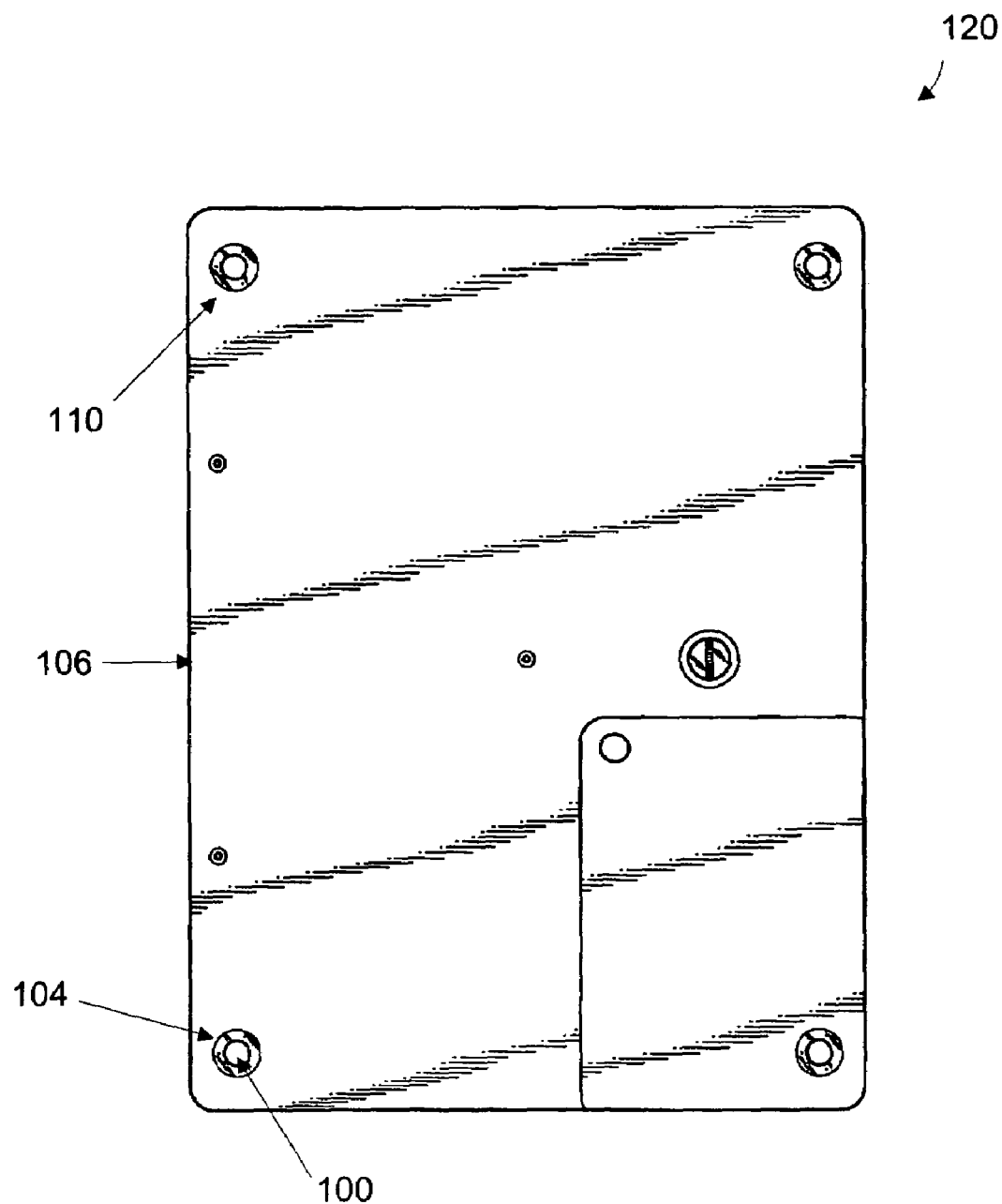
FIG. 1B illustrates a bottom view of the computing device 120.
Figure 1C:
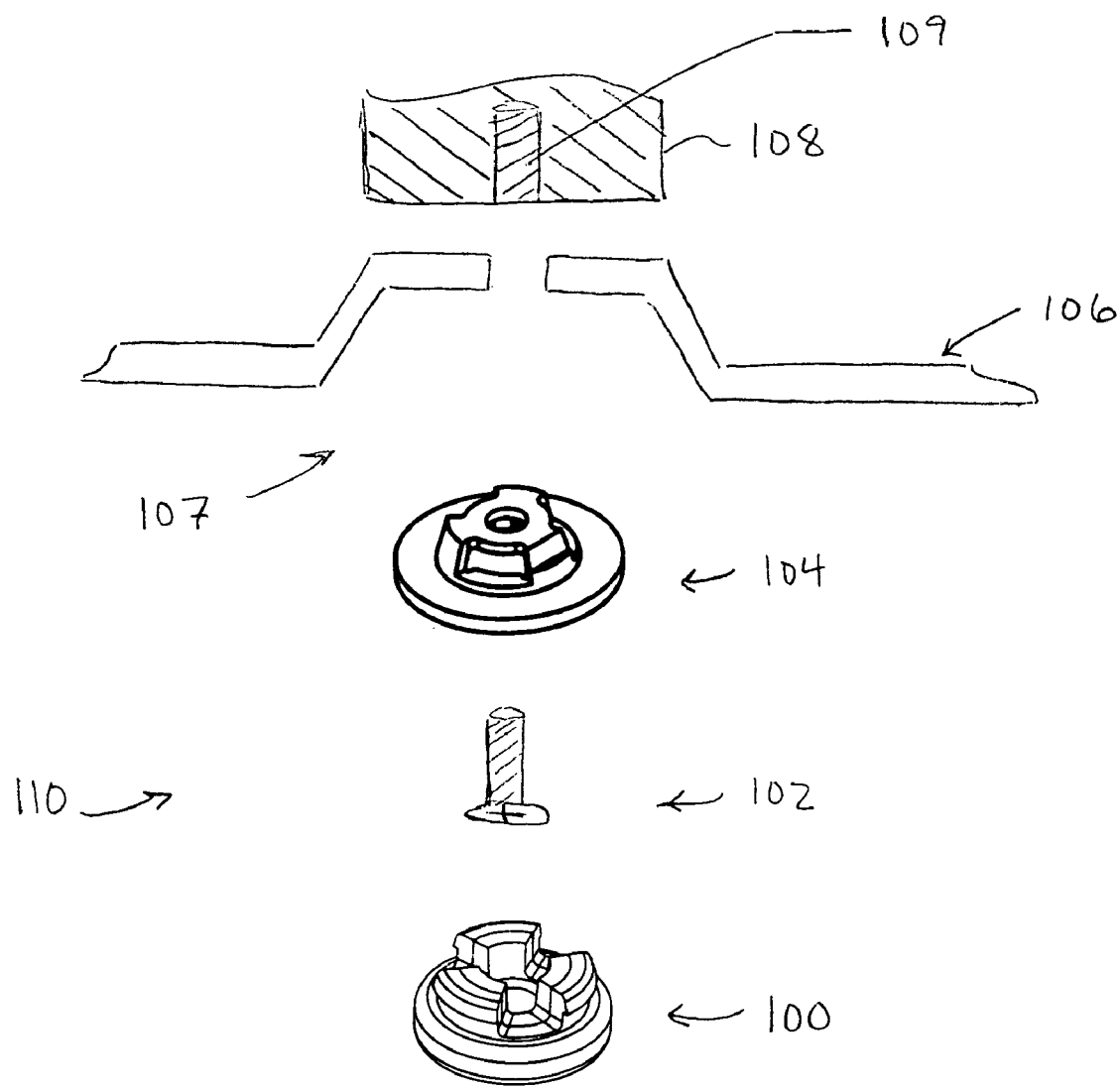
FIG. 1C illustrates an exploded view of a prior art foot assembly 110 for a portable computer.
Figure 2A:
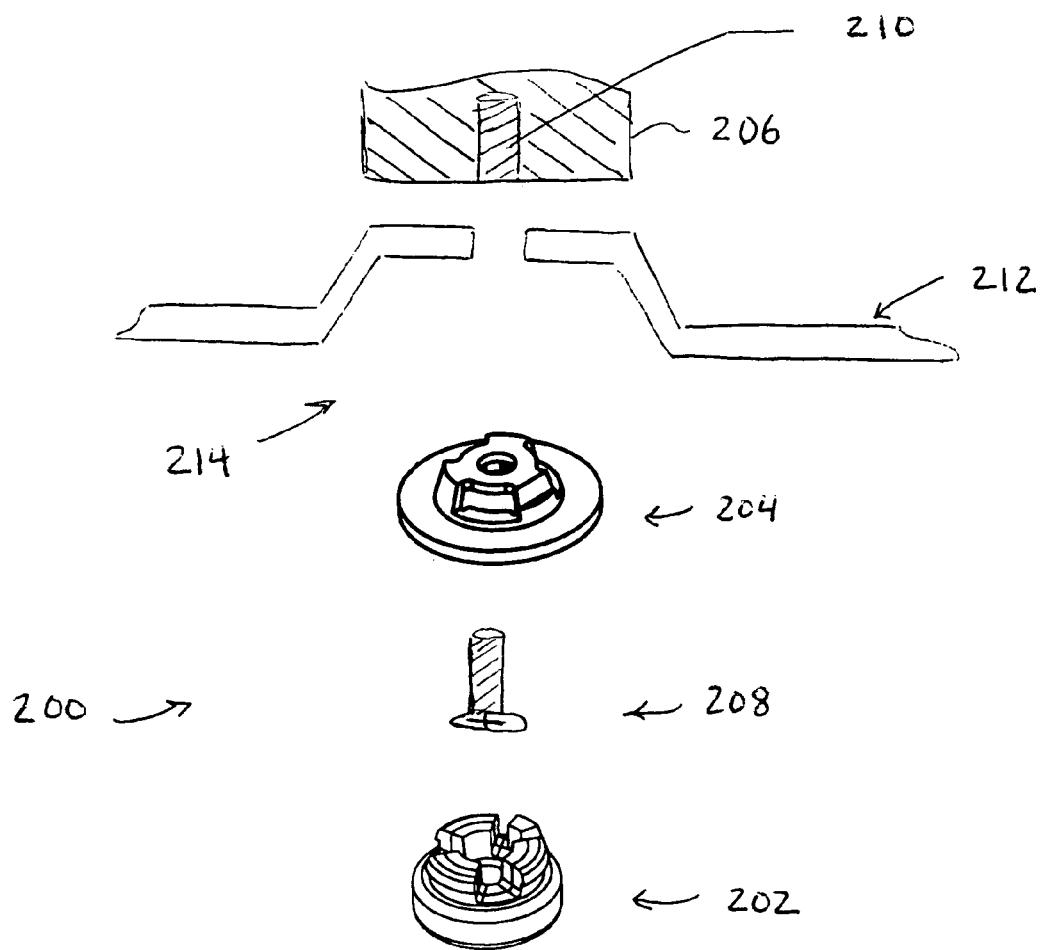
FIG. 2A illustrates an exploded view of an embodiment of a self aligning foot assembly 200.

FIG. 2A illustrates an exploded view of an embodiment of a self aligning foot assembly 200. Foot assembly 200 includes an alignment feature to assist a user in the proper installation of the foot 202 into a corresponding foot socket 204. In one embodiment, the foot assembly 200 may be used with a portable computing device 120 such as that illustrated in FIGS. 1A and 1B. A foot assembly 200 is coupled to a supporting chassis 206 with a machine screw 208. The chassis 206 and screw 208 may be made of a metal, a metal alloy, a ceramic, a plastic, or combinations thereof. In alternative embodiments, other rigid materials may be used. The chassis 206 includes an internally threaded screw bore 210 to accommodate the screw 208. The screw 208 is installed into the bore 210 to mechanically fasten the enclosure 212 and a foot socket 204 to the supporting chassis 206. The enclosure 212 is typically comprised of a rigid material, and houses the components of the computer. The enclosure 212 may be made of a metal, a metal alloy, a ceramic, a plastic, or combinations thereof. In alternative embodiments, other rigid materials may be used. The enclosure 212 includes a recessed well 214 to accommodate the socket 204. The screw 208 is fastened through the foot socket 204 into the bore 210 to retain the enclosure 212 to the supporting chassis 206. Once the screw 208 is installed, the head of screw 208 remains exposed within the center of the socket 204. To cover the head of screw 208, a foot 202 is installed into the foot socket 204. In one embodiment, the foot 202 serves both cosmetic and functional purposes.

Figure 2B:
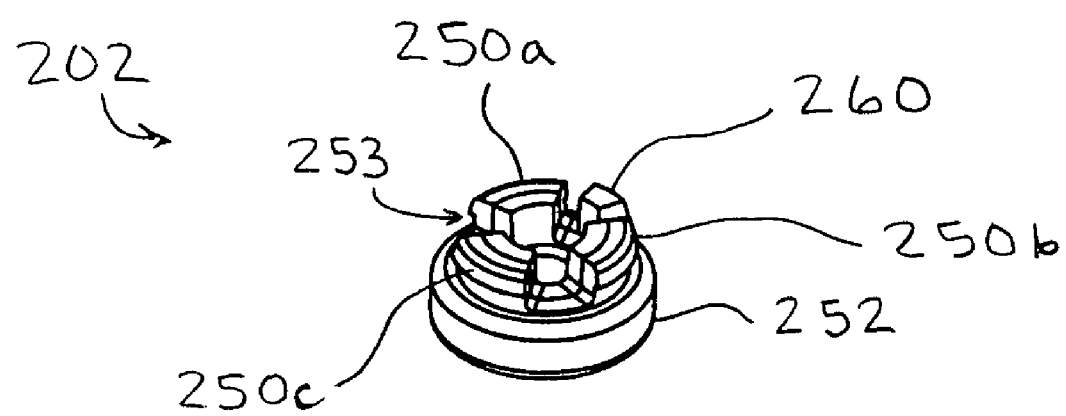
FIG. 2B illustrates a perspective view of an embodiment of a foot 202.

FIG. 2B illustrates a perspective view of an embodiment of a foot 202. Foot 202 includes three snaps 250a, 250b, 250c extending from a cylindrical base 252. The three snaps 250a, 250b, 250c are positioned radially about the perimeter of the base 252. In one embodiment, snaps 250a and 250b are each spaced an equal distance from snap 250c. In another embodiment, the snaps 250a, 250b, 250c are spaced substantially equally from each other. In one embodiment, the outermost arc lengths of the snaps 250a, 250b and 250c are substantially equal. In another embodiment, the outermost arc lengths of the snaps 250a and 250b are substantially equal.

Foot 202 also includes a post 260. Post 260 is an alignment feature or key which is used for proper rotational alignment and orientation of the foot 202 with the socket 204. In one embodiment, post 260 is positioned between snaps 250a and 250b. Post 260 is coupled to the base 252 at a proximal end. In one embodiment, post 260 extends substantially perpendicular from base 252. In one embodiment, the distance of the distal end of post 260 from base 252 is substantially equal to the distance of the distal end of the snaps 250 from the base 252. In one embodiment, post 260 has a substantially trapezoidal cross-section.

Figure 2C:
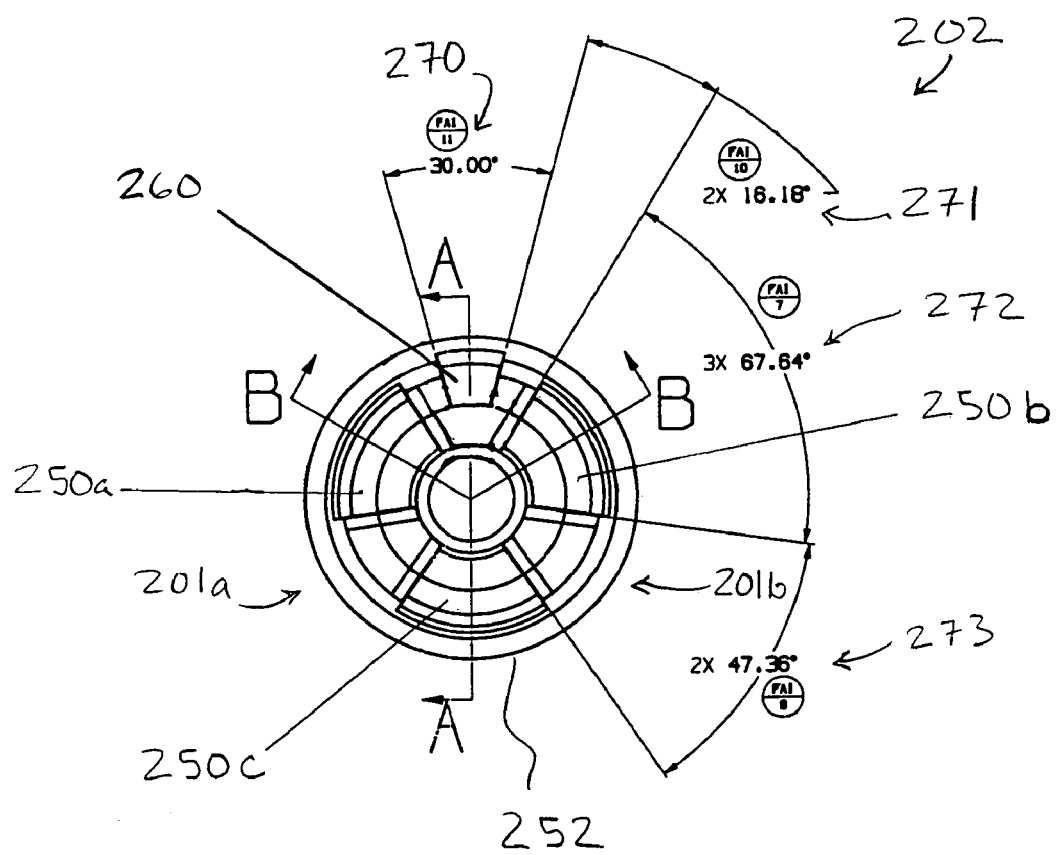
FIG. 2C illustrates a top view of an embodiment of the foot 202.
Figure 2D:
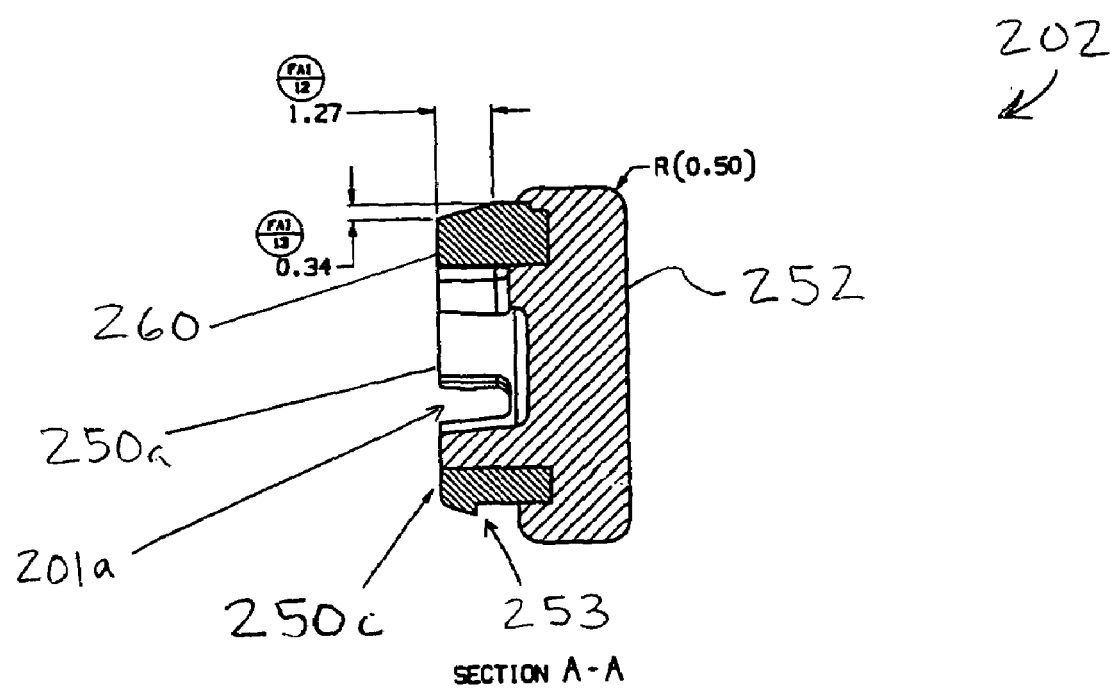
FIG. 2D illustrates a cross-sectional side view of an embodiment of the foot 202 taken along the section A-A in FIG. 2C.
Figure 2E:
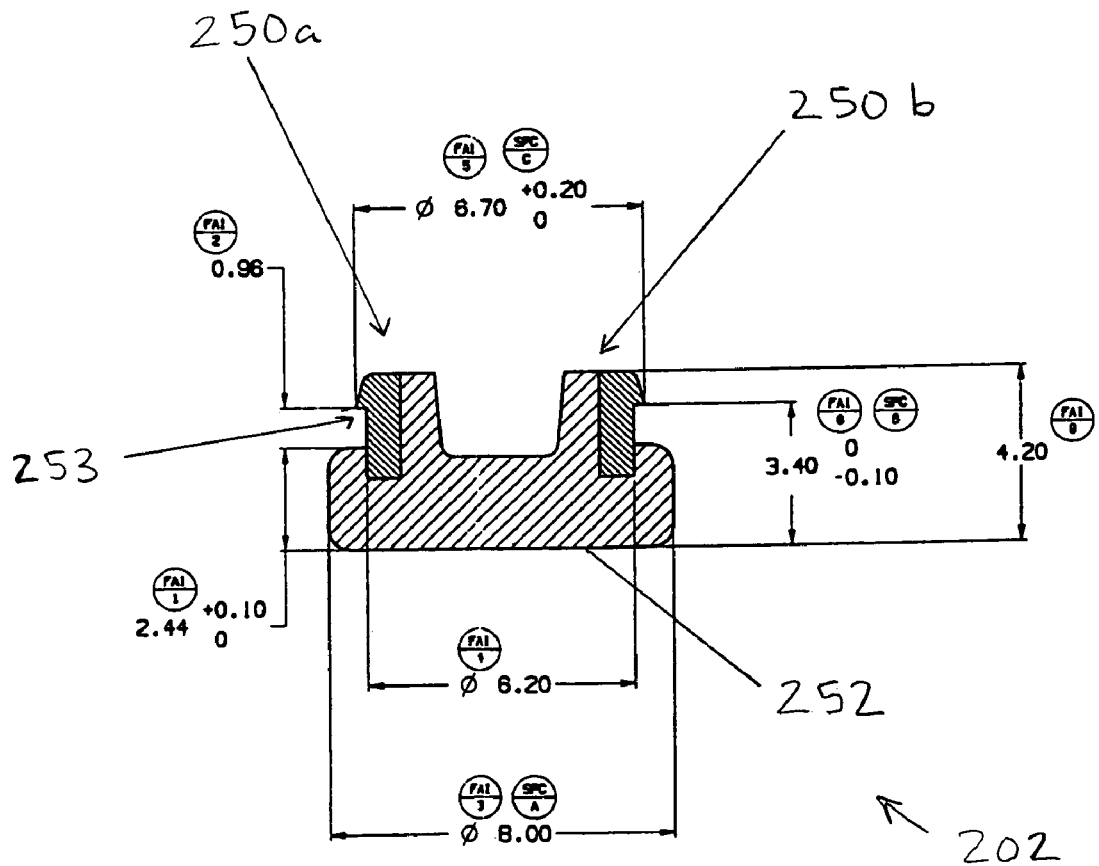
FIG. 2E illustrates a cross-sectional side view of an embodiment of the foot 202 taken along the section B-B in FIG. 2C.

FIG. 2C illustrates a top view of the foot 202. The top view illustrates the non-visible portion of the foot which is not exposed when the foot 202 is installed into the socket 204. FIG. 2D illustrates a cross-sectional side view of the foot 202 taken along the section A-A in FIG. 2C. FIG. 2E illustrates a cross-sectional side view of the foot 202 taken along the section B-B in FIG. 2C. A clearance 201a is positioned between adjacent snaps 250a and 250c. A clearance 201b is positioned between adjacent snaps 250b and 250c. In one embodiment, foot 202 is bilaterally symmetric with respect to section A-A of FIG. 2C. Each snap 250a, 250b, 250c is attached to the base 252 at a proximal end of the snap 250. In one embodiment, each snap 250a, 250b, 250c has a substantially wedge shaped cross section. A pawl 253 is an engagement disposed at the distal end of each snap 250a, 250b, 250c from the base 252. Pawl 253 includes an edge near the distal end of each snap 250a, 250b, 250c. Pawl 253 is designed such that when foot 202 is installed into foot socket 204, the pawl 253 catches the snap 250a, 250b, 250c on the foot socket 204 so as to prevent the foot 202 from disengaging the foot socket 204. In one embodiment, the post 260 extends from the base 252 a greater distance or height than the distance which the pawl 253 extends from the base 252. Advantages of the post 260 being taller than the pawl 253 engagement are discussed below.

In one embodiment, the foot 202 is made using a double-shot injection mold process. By double-shot, it is meant that the foot 202 is made through a two step process using two materials. The foot is molded by injecting a first shot of a base material into a mold, followed by a second shot of material into the mold. In one embodiment, a first shot of a rigid material, such as ABS plastic, is overmolded with a second shot of an elastomeric material, such as rubber. ABS plastic includes any of a class of plastics based on acrylonitrile-butadiene-styrene copolymers. It will be appreciated that other materials may be used. For example, instead of ABS plastic, other rigid materials, such as other plastics, a metal, a metal alloy, a ceramic, or combinations thereof may be used. In another embodiment, other flexible materials may be used besides rubber. In one embodiment, the second shot is comprised of a thermoplastic polyurethane elastomer (TPU), such as ELLASTOLAN® TPU available from BASF Corporation, Mount Olive, N.J. Referring again to FIG. 2D, an embodiment of the foot 202 is illustrated in which a first material, for example ABS plastic, is used to mold the post 260 and an outer portion of the snaps 250. In another embodiment, a second material, for example rubber, is used to mold an inner portion of the snaps 250 and the base 252 of the foot 202. In one embodiment, the post 260 is extruded. In an alternate embodiment, the foot 202 may be made of a single material, injected in a single shot. In one embodiment, the foot 202 has a mass of about 0.17 grams. In one embodiment, foot 202 has a total volume of about 145.3 $mm^3$.

Figure 2F:
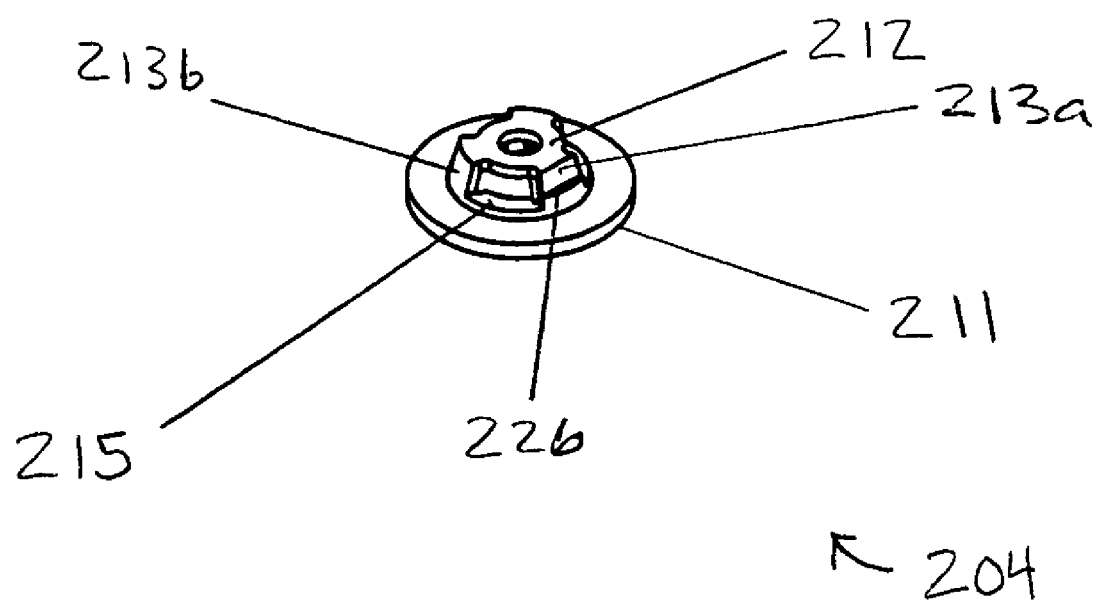
FIG. 2F illustrates a perspective view of an embodiment of a foot socket 204.

FIG. 2F illustrates a perspective view of an embodiment of a foot socket 204. Foot socket 204 includes a substantially cylindrical base 211 and a raised center portion 212. The base 211 is disc shaped, with a bore in the center. The raised center portion 212 has a substantially circular shape, and is coupled to the base 211 by three supports 213a, 213b, 213c. In one embodiment, the supports 213a, 213b, 213c are positioned radially about the base 211. The center portion 212 has diameter that is less than the diameter of the base 211. In one embodiment, the socket 204 is indexed in the well 214 using a ledge 226 so that the socket 204 may only be placed in the well 214 in a single rotational orientation.

Figure 2G:
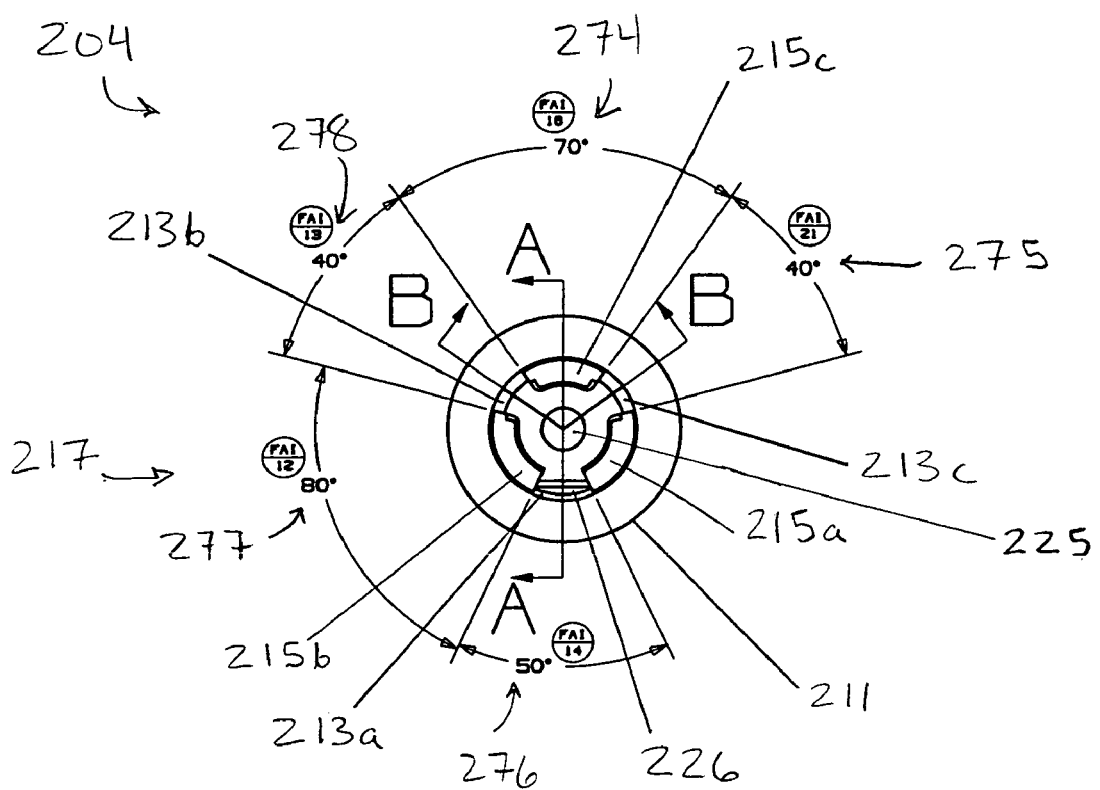
FIG. 2G illustrates a top view of an embodiment of the foot socket 204.
Figure 2H:
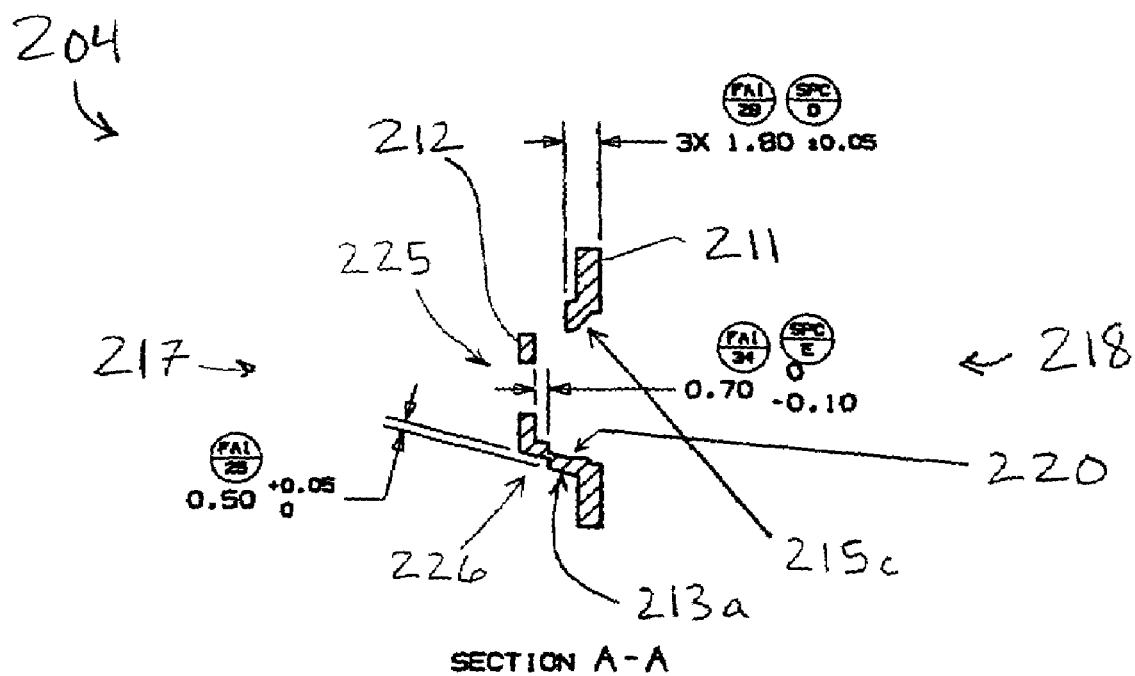
FIG. 2H illustrates a cross-sectional side view of an embodiment of the foot socket 204 taken along the section A-A in FIG. 2G.
Figure 2I:
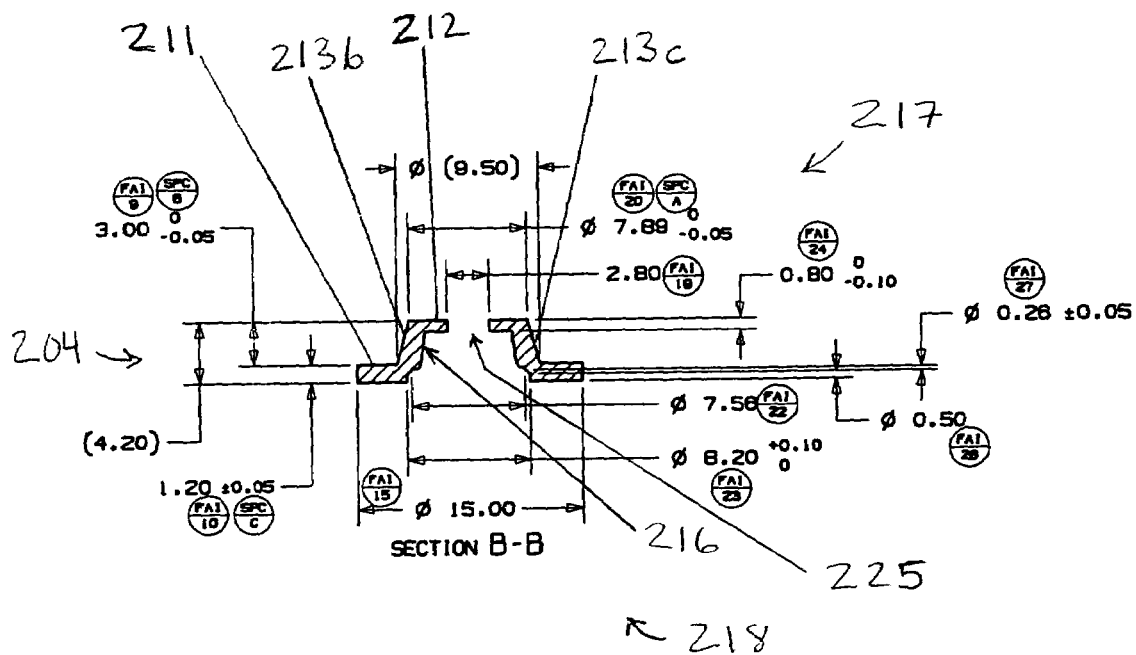
FIG. 2I illustrates a cross-sectional side view of an embodiment of the foot socket 204 taken along the section B-B in FIG. 2G.
Figure 2J:
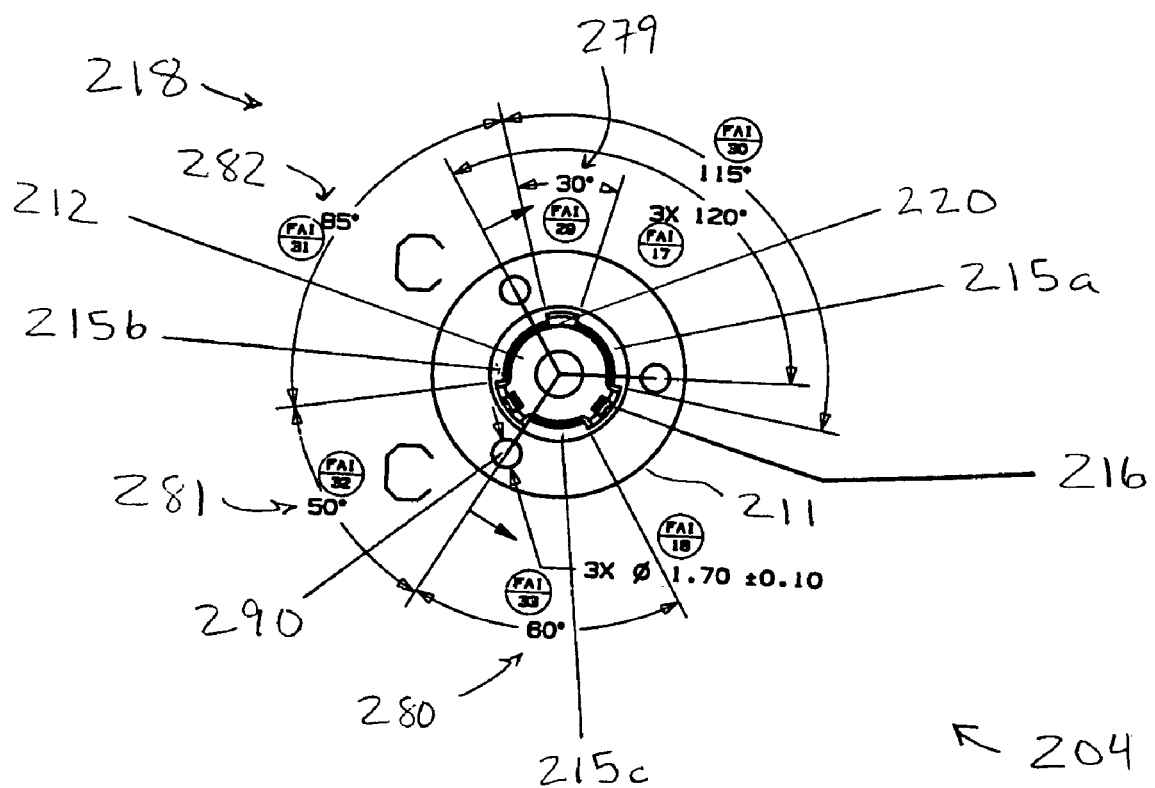
FIG. 2J illustrates a bottom view of an embodiment of the foot socket 204.
Figure 2K:
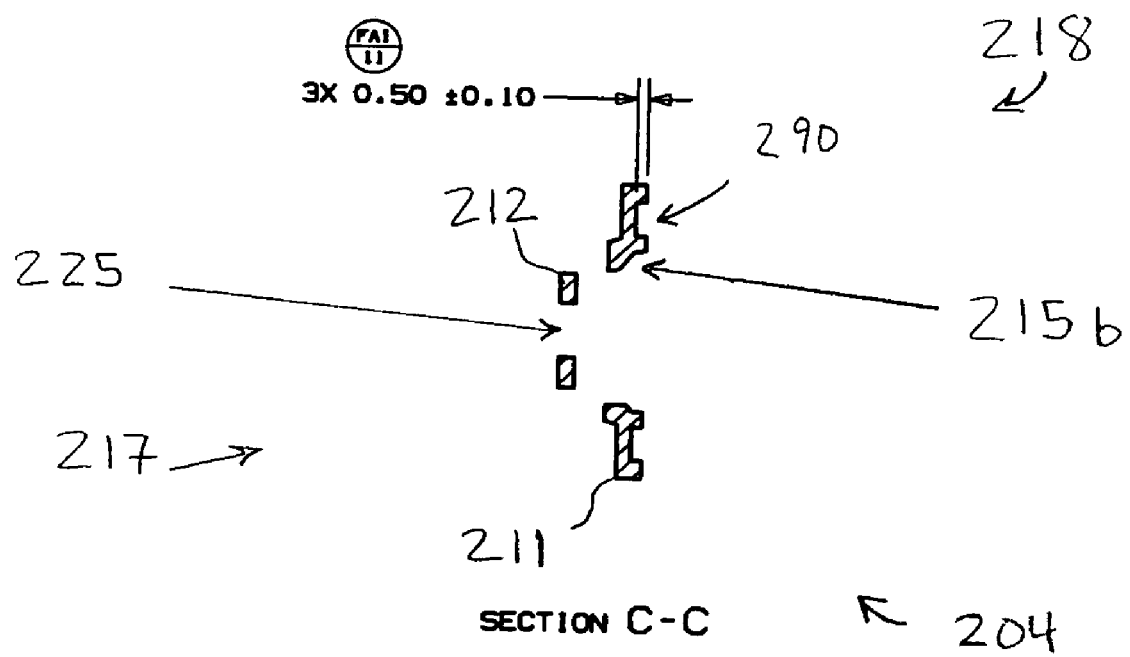
FIG. 2K illustrates a cross-sectional side view of an embodiment of the foot socket 204 taken along the section C-C in FIG. 2J.

FIG. 2G illustrates a top view of the foot socket 204. FIG. 2H illustrates a cross-sectional side view of the foot socket 204 taken along the section A-A in FIG. 2G. FIG. 2I illustrates a cross-sectional side view of the foot socket 204 taken along the section B-B in FIG. 2G. FIG. 2J illustrates a bottom view of the foot socket 204. FIG. 2K illustrates a cross-sectional side view of the foot socket 204 taken along the section C-C in FIG. 2J. In one embodiment, the socket 204 is bilaterally symmetric about section A-A in FIG. 2G. The raised center portion 212 includes an aperture 225 to accommodate screw 208. When screw 208 is installed into chassis 206, the head of screw 208 is adjacent to a bottom or an exterior side 218 of the socket 204, while the top or interior side 217 of the socket 204 is adjacent to the surface of well 214 of the enclosure 212. In one embodiment, socket 204 includes three circular cosmetic features 290 on the exterior surface 218 of the base 211. Foot socket 204 includes three undercuts 215a, 215b, 215c. Each undercut 215 is disposed between two adjacent supports 213. For example, in one embodiment, undercut 215a is disposed between supports 213a and 213c. The undercuts 215a, 215b, 215c are coupled to the base 211 and extend towards the central axis of the base 211. In one embodiment, undercuts 115 are substantially flat, curved edges on which pawl 253 catches when foot 202 is installed into the foot socket 204.

In one embodiment, foot socket 204 includes two vertical orientation ribs 216. In one embodiment, a vertical rib 216 is disposed on the exterior side 218 of each of supports 213b and 213c, and runs along the length of each support 213b, 213c between the base 211 and the center portion 212. The vertical ribs 216 are designed to assist in the alignment of the snaps 250 during installation of the foot 202 into the socket 204. The ribs 216 are designed to avoid the snaps 250 from aligning with the supports 213. In one embodiment, foot socket 204 does not include a vertical rib on support 213a. Instead, a recess or slot 220 is disposed on the exterior side of support 213a.

In one embodiment, the socket 204 is die-cast. The socket 204 may be made of a metal, a metal alloy, a ceramic, a plastic, or combinations thereof. In alternative embodiments, other rigid materials may be used. In one embodiment, socket 204 is made of an aluminum alloy, such as ADC12. In one embodiment, socket 204 has a volume of about 210 mm$^3$. The socket 204 may be plated or painted in various colors and surface textures. In one embodiment, the socket 204 has a mass of about 0.6 grams.

Aspects of the physical characteristics of particular embodiments of the present invention are now described. It will be appreciated that variations in materials, shapes, dimensions and angles may be made, among other variations, from the particular embodiments of the invention described below.

Referring to FIG. 2A, in one embodiment, the machine screw 208 is an M2.5 ×5 mm screw. Referring to the illustration of foot 202 in FIG. 2C, post 260 has an arc angle 270 of about 30 degrees. The arc angle 271 between post 260 and snap 250b, and between post 260 and snap 250a, is about 16.18 degrees. The arc angle 272 of each snap 250 is about 67.64 degrees. The arc angle 273 between snaps 250b and snap 250c, and between snaps 250a and 250c is about 47.36 degrees. Referring to FIG. 2D, post 260 tapers about 0.34 mm inward starting from about 1.27 mm from the distal end of post 260 from the base 252 towards the distal end of post 260. In one embodiment, the edge of the base 252 a 0.50 mm radius or blend (R0.50) applied to the edge between the upper and side surfaces of the base 252. Referring to FIG. 2E, the diameter of the pawls 253 about the base 252 is about 6.70 mm, with a tolerance of about +0.2 mm. The diameter of the snaps 250 about the base 252 is about 6.20 mm. The height of pawls 253 from the upper surface of base 252 is about 0.96 mm. The height of pawls 253 from the lower surface of base 252 is about 3.40 mm with a tolerance of about −0.10 mm. The height of base 252 is about 2.44 mm with a tolerance of about +0.10 mm. The diameter of base 252 is about 8.00 mm. The overall height of the foot 202 from the lower surface of base 252 to the upper surface of the snaps 250 is about 4.20 mm.

Referring to the illustration of socket 204 in FIG. 2G, in one embodiment, the arc angle 274 of undercut 215c is about 70 degrees. The arc angle 275 of support 213c is about 40 degrees. The arc angle 276 of support 213a is about 50 degrees. The arc angle 277 of undercut 215b is about 80 degrees. The arc angle 278 of support 213b is about 40 degrees. Referring to FIG. 2H, the height of the upper surface of undercuts 215 from the lower surface of base 211 is about 1.80 mm with a tolerance of about ±0.05 mm. The depth of ledge 226 from support 213a is about 0.50 mm with a tolerance of about +0.05 mm. The depth of the upper surface of slot 220 from the lower surface of the center portion 212 is about 0.70 mm with a tolerance of about −0.10 mm.

Referring to FIG. 2I, in one embodiment, the depth of the upper surface of base 211 from the upper surface of center portion 212 is about 3.00 mm with a tolerance of about −0.05 mm. The overall height of socket 207 is about 4.20 mm. The height of base 211 is about 1.20 mm with a tolerance of about ±0.05 mm. The outer diameter of base 211 is about 15.00 mm. The inner diameter of base 211 is about 8.20 mm with a tolerance of about +0.10 mm. The diameter of the respective proximal ends of vertical ribs 216 from the supports 213b, 213c positioned about base 211 is about 7.56 mm. The height of the lower surface of the vertical ribs 216 from the lower surface of base 211 is about 0.76 mm, with a tolerance of about ±0.05 mm. The center portion 212 is about 0.80 mm thick, with a tolerance of about −0.10 mm. The aperture 225 has a diameter of about 2.80 mm. The diameter of the center portion 212 is about 7.89 mm with a tolerance of about −0.05 mm. The diameter of the supports 213 positioned about base 211 at base 211 is about 9.50 mm.

Referring to FIG. 2J, in one embodiment, arc angle 279 of slot 220 is about 30 degrees. Cosmetic features 290 are spaced about 120 degrees apart about the base 211. Circular cosmetic features 290 each have a diameter of about 1.70 mm, with a tolerance of about ±0.10 mm. Arc angle 280 of undercut 215c is about 60 degrees. Arc angle 281 between undercuts 215c and 215b is about 50 degrees. Arc angle 282 of undercut 215b is about 85 degrees. Referring to FIG. 2K, the depth of cosmetic features 290 from the lower surface of base 211 is about 0.50 mm with a tolerance of about ±0.10 mm.

Figure 1D:
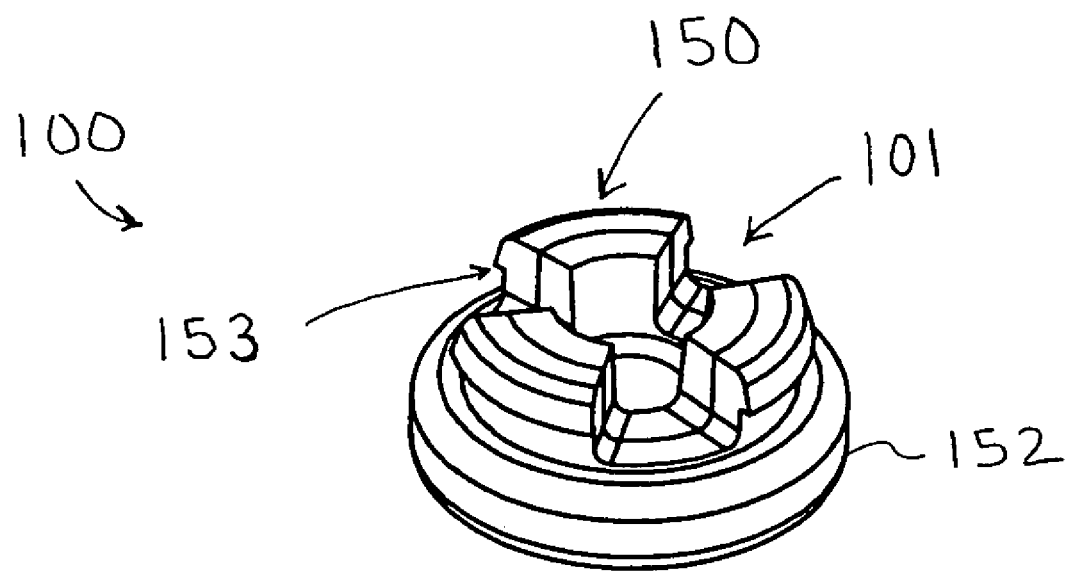
FIG. 1D illustrates a perspective view of the prior art foot 100.
Figure 1E:
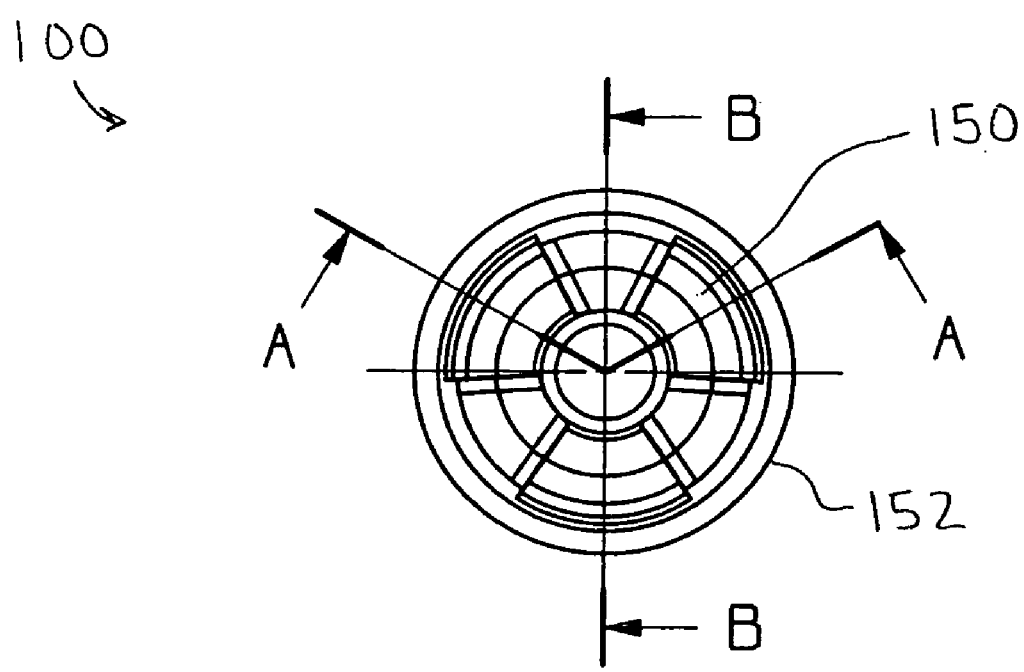
FIG. 1E illustrates a top view of the foot 100.
Figure 1F:
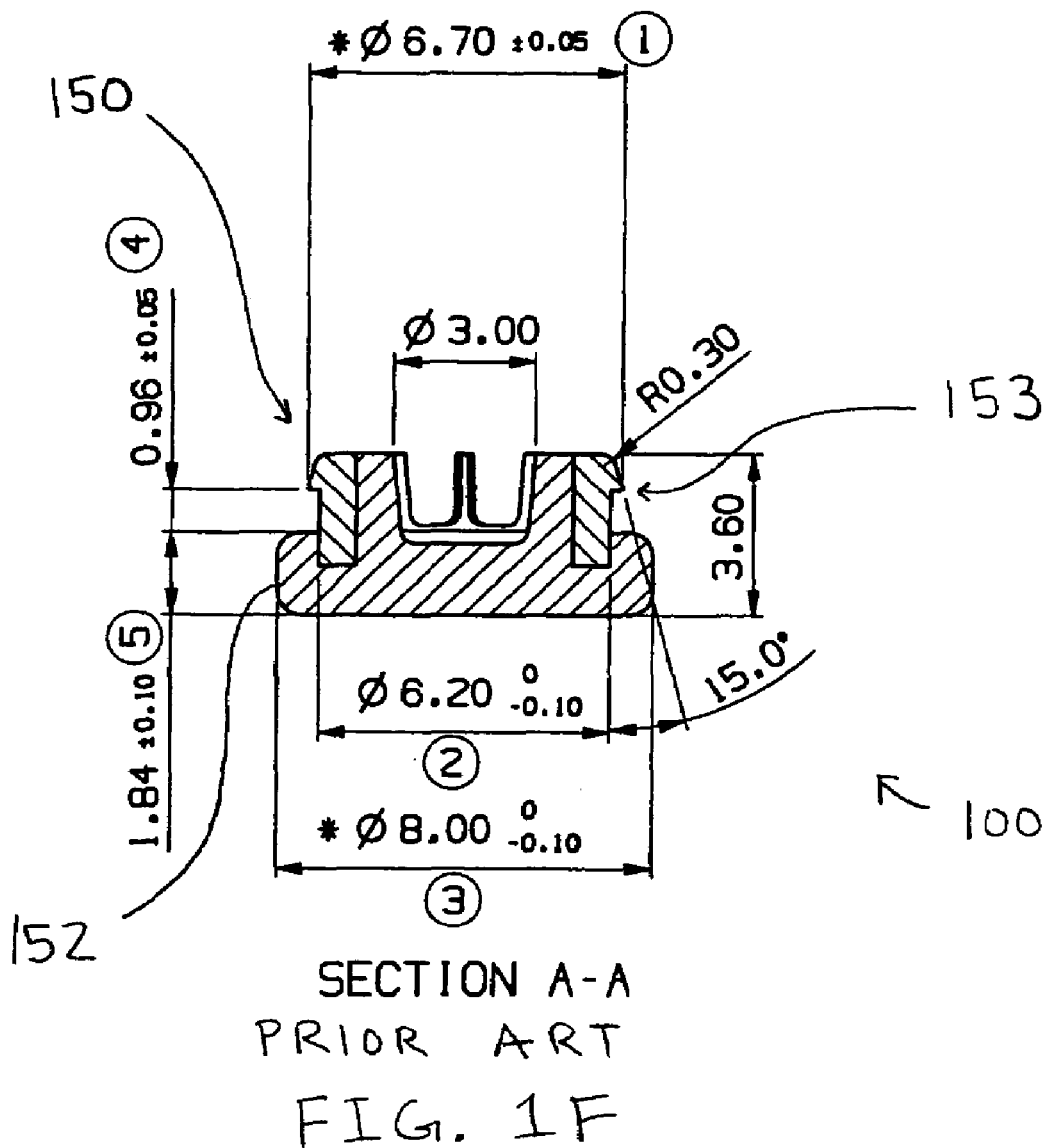
FIG. 1F illustrates a cross-sectional side view of the foot 100 taken along the section A-A in FIG. 1E.
Figure 1G:
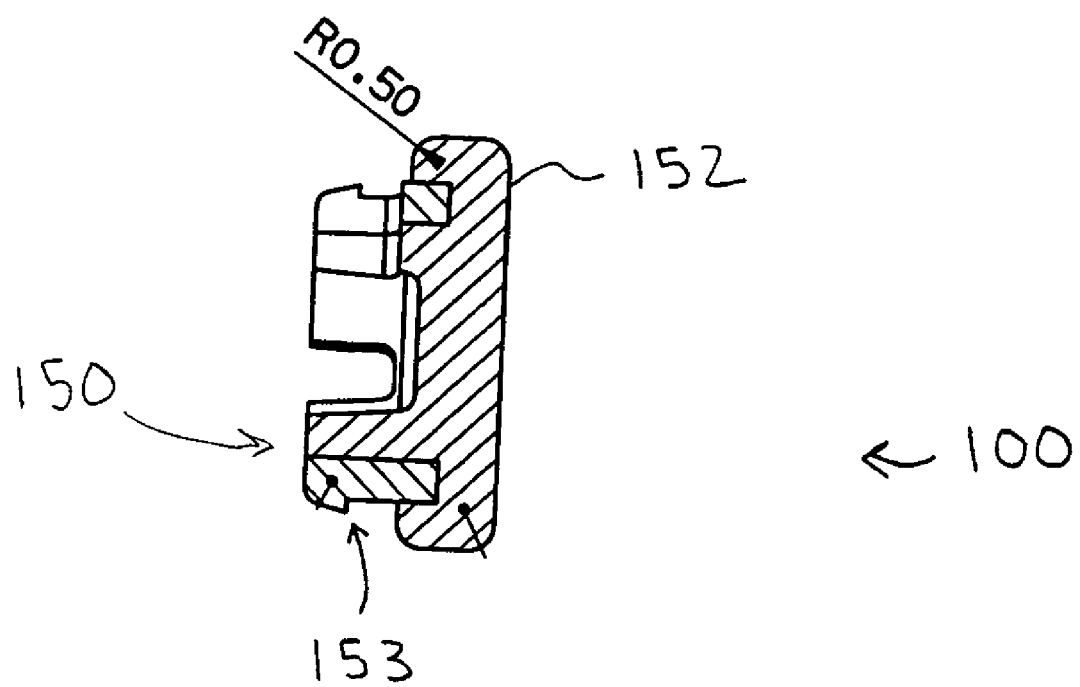
FIG. 1G illustrates a cross-sectional side view of the foot 100 taken along the section B-B in FIG. 1E.
Figure 1H:
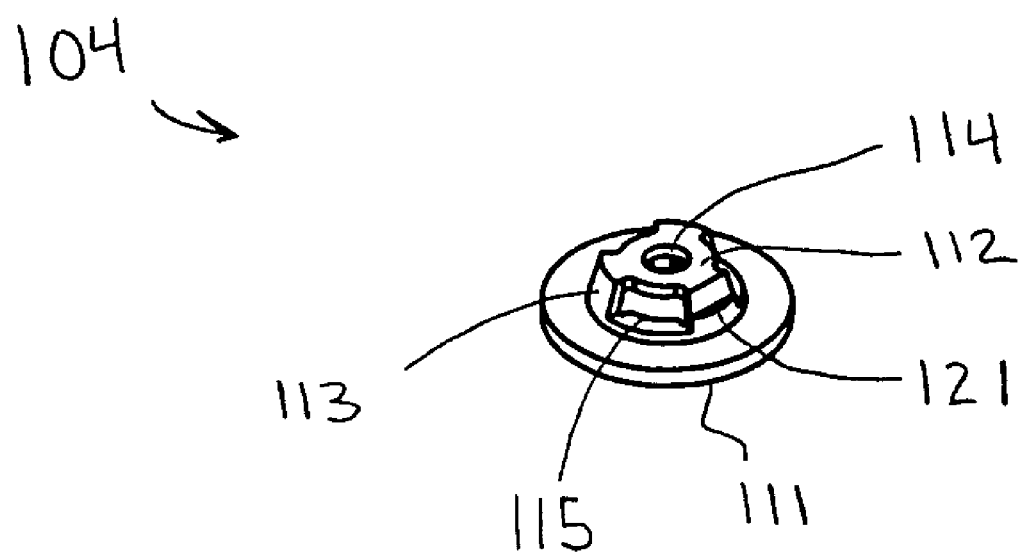
FIG. 1H illustrates a perspective view of a prior art foot socket 104.
Figure 1I:
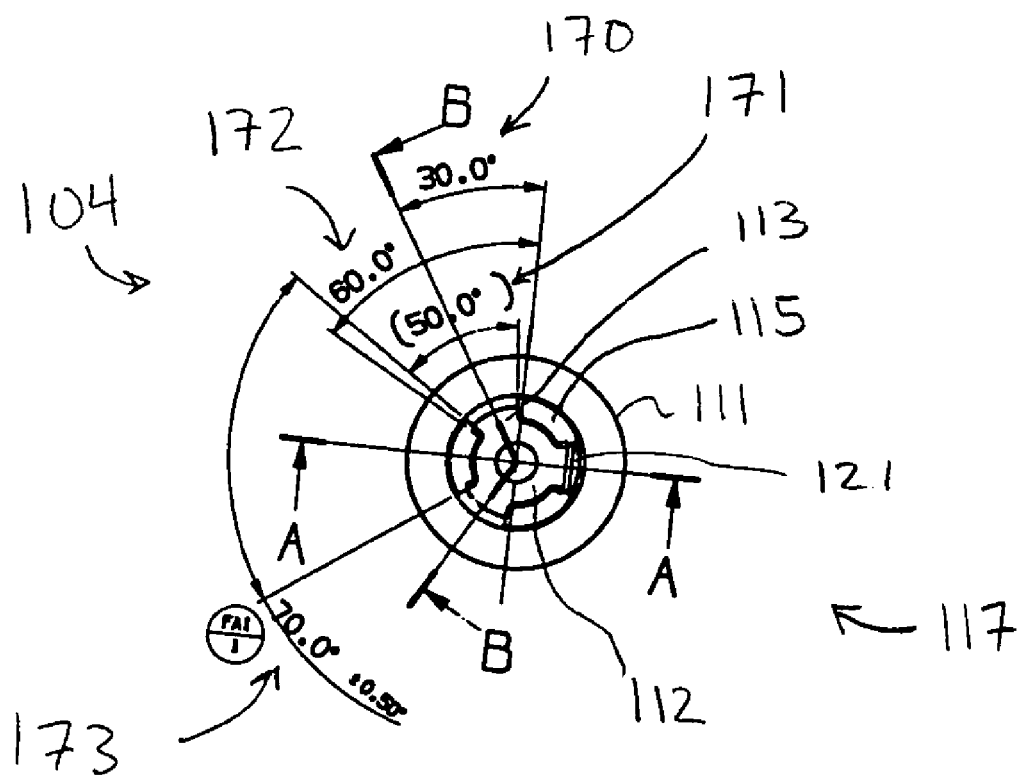
FIG. 1I illustrates a top view of the foot socket 104.
Figure 1J:
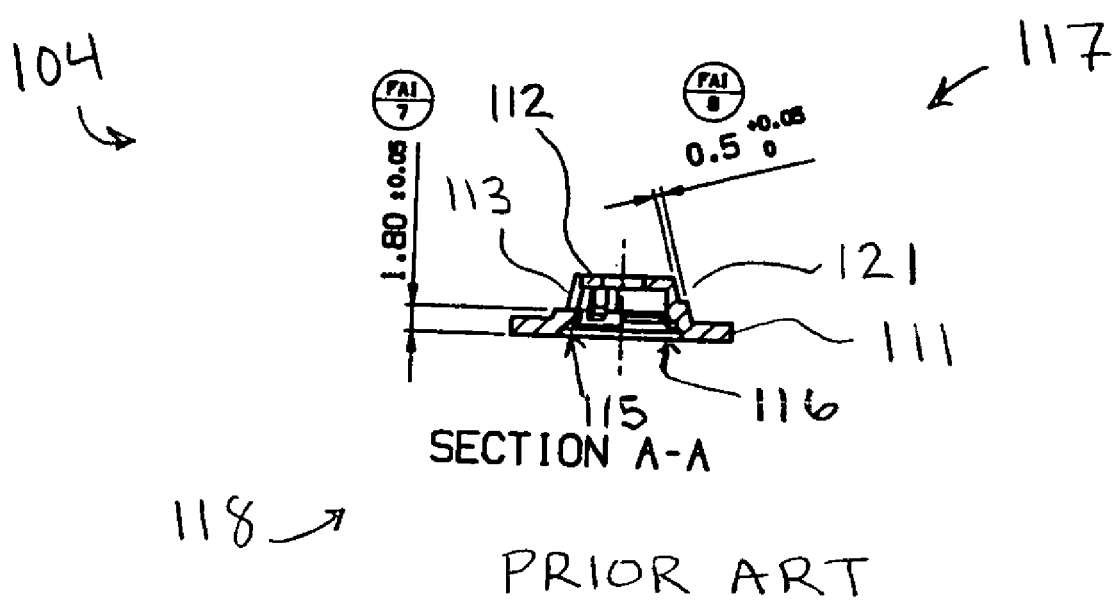
FIG. 1J illustrates a cross-sectional side view of the foot socket 104 taken along the section A-A in FIG. 1I.
Figure 1K:
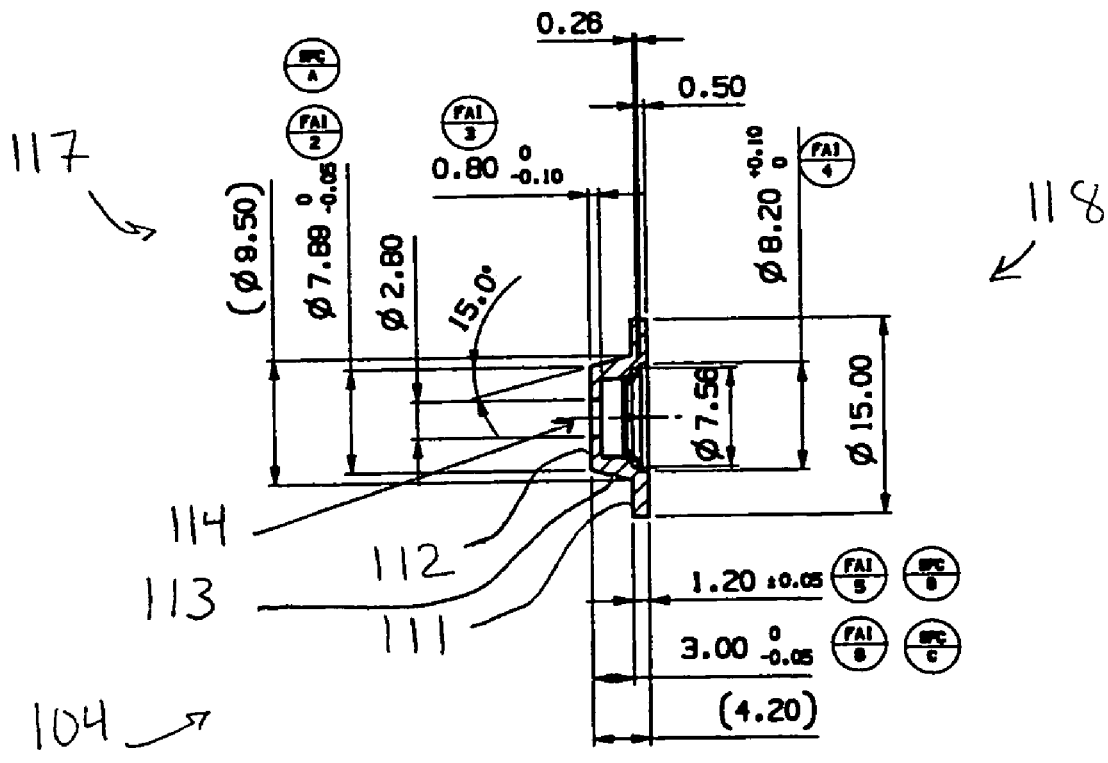
FIG. 1K illustrates a cross-sectional side view of the foot socket 104 taken along the section B-B in FIG. 1I.
Figure 1L:
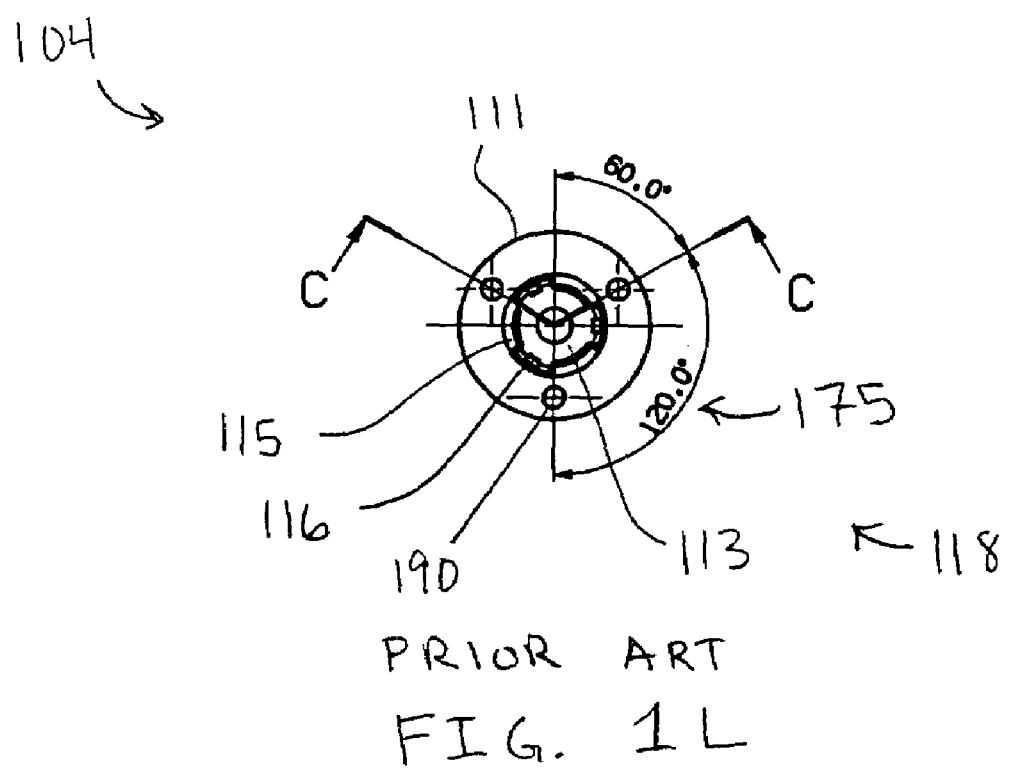
FIG. 1L illustrates a bottom view of the foot socket 104.
Figure 1M:
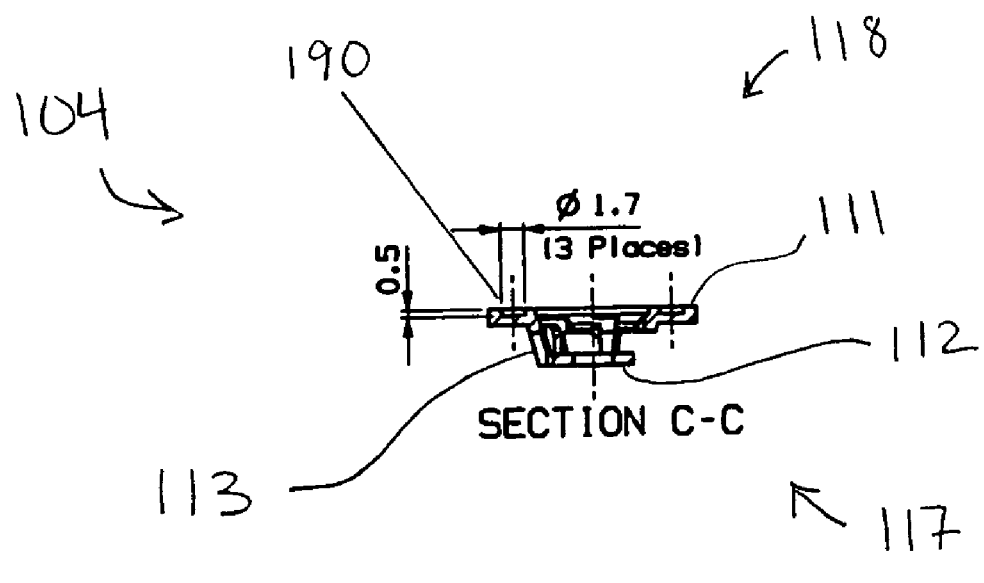
FIG. 1M illustrates a cross-sectional side view of the foot socket 104 taken along the section C-C in FIG. 1L.

To summarize certain aspects of the present invention, it will be noted that in the embodiments illustrated in FIGS. 2A-2K, the foot assembly 200 differs substantially from the prior art foot assembly 110 with respect to several features. In one embodiment, the foot 202 includes an alignment post 260 between two snaps 250a and 250b, whereas the prior art foot 100 illustrated in FIG. 1D lacks such a feature. Furthermore, in one embodiment, the foot socket 204 includes a slot 220 on support 213a and vertical ribs 216 on the remaining two supports 213b, 213c, whereas the prior art foot socket 104 includes a vertical rib 116 on each of the three supports 113. The features of embodiments of the present invention have several advantages over the prior art, some of which are now described.

Referring again to FIGS. 1A-1M, ideally during installation of the prior art foot 100, the pawls 153 of the snaps 150 align with the undercuts 115 of the socket 104. Under a compression force applied to the foot 100 against the exterior side 118 of socket 104, the snaps 150 flex towards the center of the foot 100 through cantilever motion, until the pawls 153 catch on the undercuts 115 of the socket 104, thereby retaining the foot 100 within the socket 104. However, a user installing the foot 100 into the socket 104 may have difficulty determining whether the snaps 150 are properly aligned with the undercuts 115. Consequently, when installing a foot 100 into the socket 104, the foot 100 may be installed in an improper orientation with respect to the socket 104 simply by forcing the foot 100 into the socket 104. For example, an improper installation orientation may result in a snap 150 being aligned with a vertical rib 116.

During installation of the prior art foot 100 to the prior art socket 104, the snaps 150 may engage the undercuts 115 before the vertical ribs 116 engage the foot 100. This is due to the positioning of distal end of the vertical ribs 116 from the center portion 112 being less than or equal to the positioning of the undercuts 115 from the center portion 112. In other words, during a misaligned installation of a prior art foot 100, the snaps 150 may engage the undercuts 115 either simultaneously or before the snaps 150 contact the vertical ribs 116. Thus the vertical ribs 116 may not effectively prevent the snaps 150 from engaging the socket 104 during a misaligned installation. The result is variable foot 100 retention based on the user's installation orientation. Furthermore, the force exerted on the foot 100 during a misaligned installation may greatly reduce the retention force of the snaps 150 through deflection of the snaps 150, among other potential damage. Although a misaligned foot 100 may be retained in the socket 104 temporarily, over time and use, the misaligned installation may result in the foot 100 becoming dislodged from the socket 104 and cause the foot 100 to fall out. Although the snaps 150 may help to align the foot 100 with the socket 104, they do not do so prior to the engagement of the pawls 153 with the undercuts 115.

Embodiments of the present invention provide an alignment feature on the foot assembly 200 between the foot 202 and the socket 204. In particular, the post 260 of foot 202 is designed to locate or interface with the single slot 220 of foot socket 204. Thus, in one embodiment, the foot 202 may only be installed into the socket 204 in a single orientation. In one embodiment, when installing the foot 202 into the socket 204, the user aligns the post 260 on the foot 202 to the slot 220 of the socket 204 in order for all three snaps 250 to engage the undercuts 215 when the foot 202 is depressed into the socket 204. In one embodiment, when the foot 202 is properly installed, the pawls 253 of the snaps 250 constrain the foot 202 along the Z-axis with respect to the chassis 212. In one embodiment, since the socket 204 is indexed to a single orientation to the enclosure 212, the mating post 260 is oriented in the same position with respect to the socket 204 whenever the foot 202 is installed. In one embodiment, a proper alignment of the foot 202 with the socket 204 results in the clearances 201a and 201b aligning with ribs 216.

As discussed above, in one embodiment, the post 260 of foot 202 extends from the base 252 a greater distance than the distance which the pawl 253 extends from the base 252. If during installation of the foot 202 into the socket 204, the foot 202 is misaligned with respect to the socket 204, the post 260 prevents the snaps 250 from engaging the undercuts 215. Since the post 260 is taller (i.e. extends a greater distance from the base 252) than the pawls 253, the snaps 250 may not mechanically engage the undercuts 215 of the foot socket 204 until the post 260 is located properly to the slot 220 in the socket 204. During a misaligned installation attempt, the post 260 may collide with either an undercut 215 or a vertical rib 216. Such a collision will provide tactile feedback to the user indicating a misalignment of the foot 202 with respect to the socket 204. This allows for the user to correct the alignment prior to the foot 202 being retained in the socket 204, and thereby avoid potential damage to the foot 202.

Thus the orientation or alignment features of embodiments of the present invention function during installation before the snaps 250 become engaged in socket 204. During a properly aligned installation, the post 260 aligns with slot 220, and under an installation load, a compression force on the outer arc of the snaps 250 cause them to flex inwards under cantilever motion until the pawls 253 engage the undercuts 215, resulting in the foot 202 being retained in the socket 204. The contribution of user error to diminished foot retention may be minimized through the self aligning features of embodiments of the present invention. In particular, the post 260 aligns with and engages the socket 204 prior to the pawls 253 of snaps 250 engaging the undercuts 215. Additionally, once the foot 202 is properly installed, the post 260 minimizes the potential for external rotation of the foot 202 to result in the snaps 250 disengaging the socket 204, by providing a greater degree of tolerance control to the assembly 200 than that of the prior art assembly 110.

It will be appreciated that variations may be made to the various embodiments described above. For example, in one embodiment, the key and slot features of the foot 202 and socket 204 may be switched. In one embodiment, the foot 202 includes a slot which aligns to a post on the socket 204. In another embodiment, the socket may be eliminated, and the features of the socket integrated into the enclosure. For example, the enclosure may include an integral slot, integral vertical ribs, and integral undercuts, similar to those of the socket 204 described above, to which the foot 202 may align during installation of the foot into the enclosure. In one embodiment, more or less snaps 250 may be included on the foot, and a corresponding number of undercuts and supports may be included on the socket. For example, embodiments are contemplated wherein the foot includes two snaps, and the socket includes two corresponding undercuts. In another exemplary alternative embodiment, the foot 202 includes two posts, and the socket includes a single vertical rib and two slots to accommodate the posts of the foot.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A foot comprising:
   a base;
   a snap extending from the base, the snap having a proximal end and a distal end, wherein the proximal end is coupled to the base and the distal end includes an engagement pawl; and
   a post extending from the base, the post having a proximal end and a distal end, wherein the proximal end is coupled to the base and the distal end extends a greater distance from the base than the engagement pawl.

2. The foot of claim 1, wherein the foot comprises three snaps.

3. The foot of claim 2, wherein each snap includes a pawl.

4. The foot of claim 2, wherein the foot is bilaterally symmetric.

5. The foot of claim 2, wherein snaps are asymmetrically positioned on the base.

6. The foot of claim 2, wherein the snaps are substantially equally spaced about the perimeter of the base.

7. The foot of claim 2, wherein the post is positioned about the perimeter of the base between two snaps.

8. The foot of claim 1, wherein post is to align the snaps to a socket for the foot.

9. The foot of claim 1, wherein the base is substantially cylindrical.

10. The foot of claim 1, wherein the foot is coupled to an enclosure of a portable computing device.

11. A foot socket comprising:
  a base;
  a raised center portion coupled to the base by a plurality of supports, wherein a first support includes a first vertical rib, and a second support includes a slot; and
  a plurality of undercuts coupled to the base, wherein each undercut is adjacent to two supports.

12. The socket of claim 11, wherein the slot is to align with a post of a foot.

13. The socket of claim 11, wherein socket is bilaterally symmetric.

14. The socket of claim 11, further comprising a third support.

15. The socket of claim 14, wherein the third support includes a second vertical rib.

16. The socket of claim 14, further comprising three undercuts.

17. The socket of claim 11, wherein the base is cylindrical.

18. The socket of claim 11, wherein the center portion is substantially ring shaped.

19. The socket of claim 11, wherein the socket is coupled to an enclosure of a portable computing device.

20. A foot assembly comprising:
  a foot including a snap and a first alignment feature, wherein the snap and the alignment feature are coupled to a base, the first alignment feature extending a greater distance from the base than an engagement of the snap; and
  a foot socket coupled to the foot, the socket including an undercut and a second alignment feature, wherein the second alignment feature interfaces with the first alignment feature.

21. The assembly of claim 20, wherein the engagement is a pawl.

22. The assembly of claim 21, wherein the base is cylindrical.

23. The assembly of claim 21, wherein the first alignment feature is a post.

24. The assembly of claim 23, wherein the second alignment feature is a slot.

25. The assembly of claim 24, wherein the foot comprises three snaps.

26. The assembly of claim 25, wherein the socket comprises three undercuts to engage the pawls of the snaps.

27. The assembly of claim 26, wherein the socket comprises a plurality of vertical ribs.

28. The assembly of claim 20, wherein the socket is coupled to an enclosure of a portable computing device.

* * * * *